United States Patent [19]

Luongo

[11] Patent Number: 4,573,358
[45] Date of Patent: Mar. 4, 1986

[54] TURBINE BLADE VIBRATION DETECTION APPARATUS

[75] Inventor: Michael C. Luongo, Brookhaven, Pa.

[73] Assignee: Westinghouse Electric Corp., Pittsburgh, Pa.

[21] Appl. No.: 663,528

[22] Filed: Oct. 22, 1984

[51] Int. Cl.4 .................. G01H 11/00; G01M 1/22; G01M 13/00
[52] U.S. Cl. ........................................ 73/660; 73/661
[58] Field of Search ............... 73/660, 661; 324/243

[56] References Cited

U.S. PATENT DOCUMENTS

| | | | |
|---|---|---|---|
| 3,058,339 | 10/1962 | Shapiro | 73/660 |
| 3,289,073 | 11/1966 | Loeffler | 73/660 |
| 3,597,963 | 10/1971 | Smejkal | 73/660 |
| 3,654,803 | 4/1972 | Robinson | 73/660 |
| 3,908,444 | 9/1975 | Peter . | |
| 3,911,731 | 10/1975 | Walker et al. | 73/660 |
| 3,929,008 | 12/1975 | Zlotin | 73/660 |
| 4,049,644 | 9/1977 | Wennerstrom | 250/233 |
| 4,060,329 | 11/1977 | Ellis | 250/224 |
| 4,080,823 | 3/1978 | Stargardter | 73/655 |
| 4,298,948 | 11/1981 | Davis | 73/660 |
| 4,413,519 | 11/1983 | Bannister | 73/660 |
| 4,422,333 | 12/1983 | Leon | 73/660 |
| 4,507,658 | 3/1985 | Keating | 73/660 |
| 4,518,917 | 5/1985 | Oates et al. | 73/660 |

FOREIGN PATENT DOCUMENTS

| | | | |
|---|---|---|---|
| 391410 | 11/1973 | U.S.S.R. | 73/660 |
| 476456 | 7/1975 | U.S.S.R. | 73/660 |

Primary Examiner—Howard A. Birmiel
Attorney, Agent, or Firm—D. Schron

[57] ABSTRACT

A plurality of sensors are disposed equally about a blade row in a turbine with each sensor being operable to provide an output signal in response to a passing blade. A blade is selected for monitoring purposes by designating its degree location relative to a reference position ± some angular distance constituting a small window. As the selected blade passes a sensor, its output signal, properly conditioned to form a pulse, is gated during the time period corresponding to the window. The sequential pulses of the sensors form a pulse train which is modulated by any blade vibration. An FM detector is provided for demodulating the pulse train to derive vibration information.

20 Claims, 15 Drawing Figures

TURBINE BLADE VIBRATION DETECTION APPARATUS

BACKGROUND OF THE INVENTION

1. Field of the Invention

The invention in general relates to monitoring and diagnostic equipment, and particularly to equipment for measuring blade tip displacement of selected blades in one or more blade rows of a turbo machine.

2. Description of the Prior Art

Turbines or similar machines include one or more blade rows each including a plurality of radially extending blades connected to a rotating shaft member. A typical blade is of a complex design which results in multiple vibrational modes. If the natural resonance of the blade in one or more of these modes should coincide with the machine's rated rotational speed, or harmonics thereof, then the blade will have a tendency to vibrate to an extent where the blade's tip will oscillate excessively about its normal position. When the amplitude of this oscillation exceeds a certain level, objectionable stresses are set up in the blade. If the condition is not detected and remedied, the blade may eventually fracture resulting in an extremely costly forced outage of the machinery so that the problem may be corrected.

Accordingly, the blades should be tested for excessive vibration prior to being put into operation in the field so that any required design changes may be implemented prior to the machine going on line.

For those machines which are already in operation, monitoring of the blade vibration is extremely important since different pressure and temperature conditions can change the blade's resonance. In addition, there is a possibility of non-resonant vibration, known as flutter, which, if excessive, can also lead to stress fracture.

One widely used method which tests for excessive blade vibration utilizes various sensors such as strain gages affixed to the rotating blades. Sensor information is communicated to analyzing equipment outside the machine by means of miniature transmitters affixed to the machine's rotating shaft at various locations.

Although the arrangement provides for highly accurate results, the method is limited in that only a certain portion of the blades can be tested at any one time due to the limited number of transmitters that can be accommodated inside the machine. To test all of the blades therefore requires the machine to be shut down each time a new group of blades is to be tested so that the sensors may be properly affixed. The cost of the transmitters, and even the batteries therefore, are abnormally high since they must be of special design to withstand the extremely hostile environment inside the turbine. The high cost of equipment, in addition to labor costs, make such testing method prohibitive for many plant operators.

To obviate such high costs, another testing method utilizes permanently installed, non-contacting proximity sensors to detect blade tip movement. Many of these systems determines the position of a blade under test, from a reference point to see whether or not it deviates from a known position by a predetermined amount. Still other systems determine whether or not the distance between two blades varies at several positions during the course of rotation of the blades.

The apparatus of the present invention is of the type which utilizes a plurality of non-contacting sensors and in which compensation is provided in the event of sensor misalignment. This compensation, coupled with a novel detection arrangement results in a system which is highly reliable, extremely precise, and gives accurate results.

SUMMARY OF THE INVENTION

Apparatus for monitoring the individual blades of a blade row in a turbo machine includes a plurality of sensors equally spaced about the periphery of the blade row. Each sensor is of the type which will provide an output signal as a blade passes it. Signal conditioning means are provided for each sensor to convert its output signal into a corresponding narrow pulse signal. A particular blade to be monitored is entered into a blade select circuit by an operator and means are provided for combining all of the sensor pulse signals caused by the selected blade passing each of the sensors during rotation of the blade row. The combined output is a pulse train signal which is modulated as a function of blade vibration with the pulses being evenly spaced in the absence of any blade vibration. The pulse train signal is frequency demodulated with the results of such demodulation being utilized to determine blade vibration.

BRIEF DESCRIPTION OF THE DRAWINGS

Similar reference characters refer to similar parts throughout the several Figures.

DESCRIPTION OF THE PREFERRED EMBODIMENT

Figure 1:
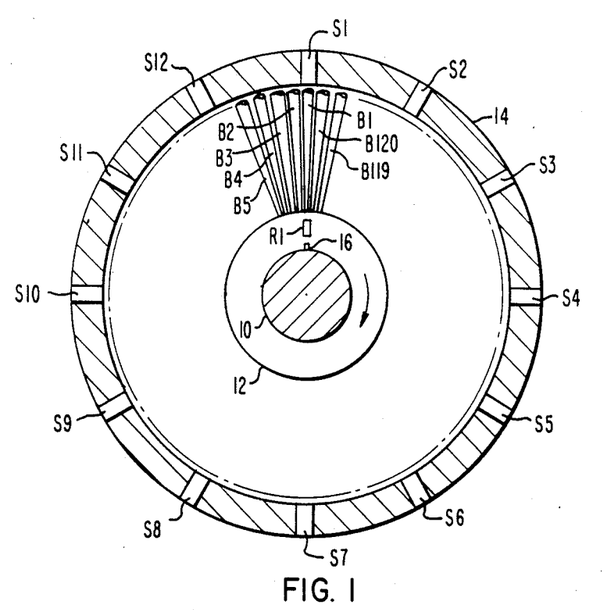
FIG. 1 is a simplified axial view of a turbine blade row illustrating the positioning of various sensors.

Although the invention is applicable to a variety of bladed turbo machines, it will be described by way of example with respect to a turbine such as a steam turbine, a simplified axial view of which is illustrated in FIG. 1.

The turbine includes a plurality of blade rows, one of which is illustrated and includes blades B1 to B120 connected to rotating shaft 10 by means of disk member 12. Although 120 blades are indicated, it is understood that such number is given merely by way of a typical example.

A plurality, N, of sensors is disposed about the periphery of the blade row with each being operable to provide an output signal as each blade passes it. In the present example, 12 sensors S1 to S12 are illustrated and are evenly spaced about the entire 360° of the blade row. For 12 sensors the angle $\alpha$ between adjacent sensors will be 360°/12, or 30°. The sensors are rigidly held in their exact positions by means of retainer 14 which may either be specially fabricated for a particular machine or may even constitute part of the machine itself, such as a turbine casing.

Figure 2:
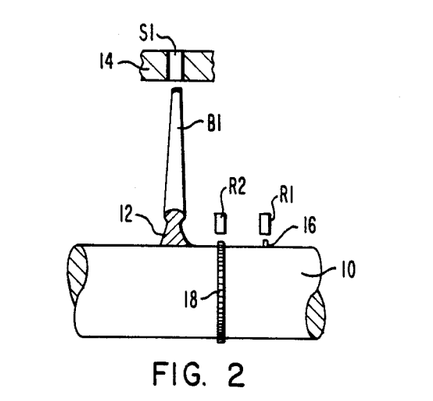
FIG. 2 is a side view of a portion of FIG. 1 illustrating the location of various sensors.

As further illustrated in FIG. 2, two reference sensors R1 and R2 are additionally provided. The sensor R1 in conjunction with indicia 16 on shaft 12 is operable to provide an output signal once per shaft revolution and sensor R2 in conjunction with a 60 tooth wheel 18 is operable to provide an output signal 60 times per shaft revolution. Such reference signals are common to many turbine systems and are utilized for control purposes.

In the present apparatus any blade may be selected for monitoring purposes to see whether or not it is vibrating during shaft rotation at one or more particular speeds. A narrow window or gating pulse is supplied to each sensor of the array just at the time that the selected blade is passing. The gated sensor signals, properly conditioned, are summed, resulting in a pulse train attributable only to the selected blade and which pulse train is provided to a novel detection means for determining blade tip vibration.

Figure 3:
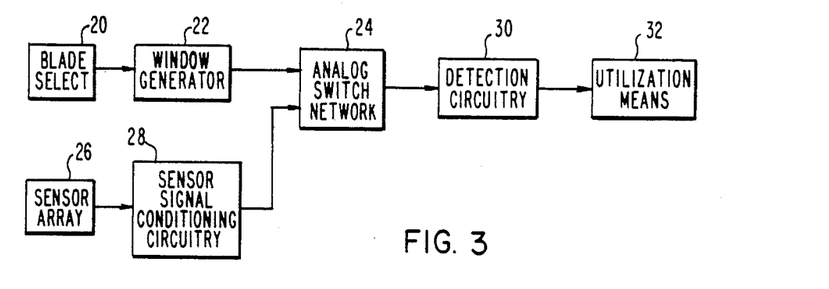
FIG. 3 is a block diagram of an embodiment of the present invention.

FIG. 3 functionally illustrates the means for performing the diagnostic process. As will be described, blade select circuitry 20 is operable to select a particular blade for monitoring purposes in response to an operator input. The selected blade being chosen, a window generator 22 is operable to provide analog switch network 24 with a narrow gating signal for gating the individual signals of the sensors of array 26, that is, sensors S1 to S12. Prior to being gated however the sensor signals are individually processed by sensor signal conditioning circuitry 28.

The sensor signals associated with the selected blade are summed at the analog switch network 24 and provided as a pulse train to detection circuitry 30 which frequency demodulates the pulse train and obtains an indication of blade tip displacement, such indication being provided to utilization means 32 such as a real time analyzer, computer, recording device, etc.

Figure 4:
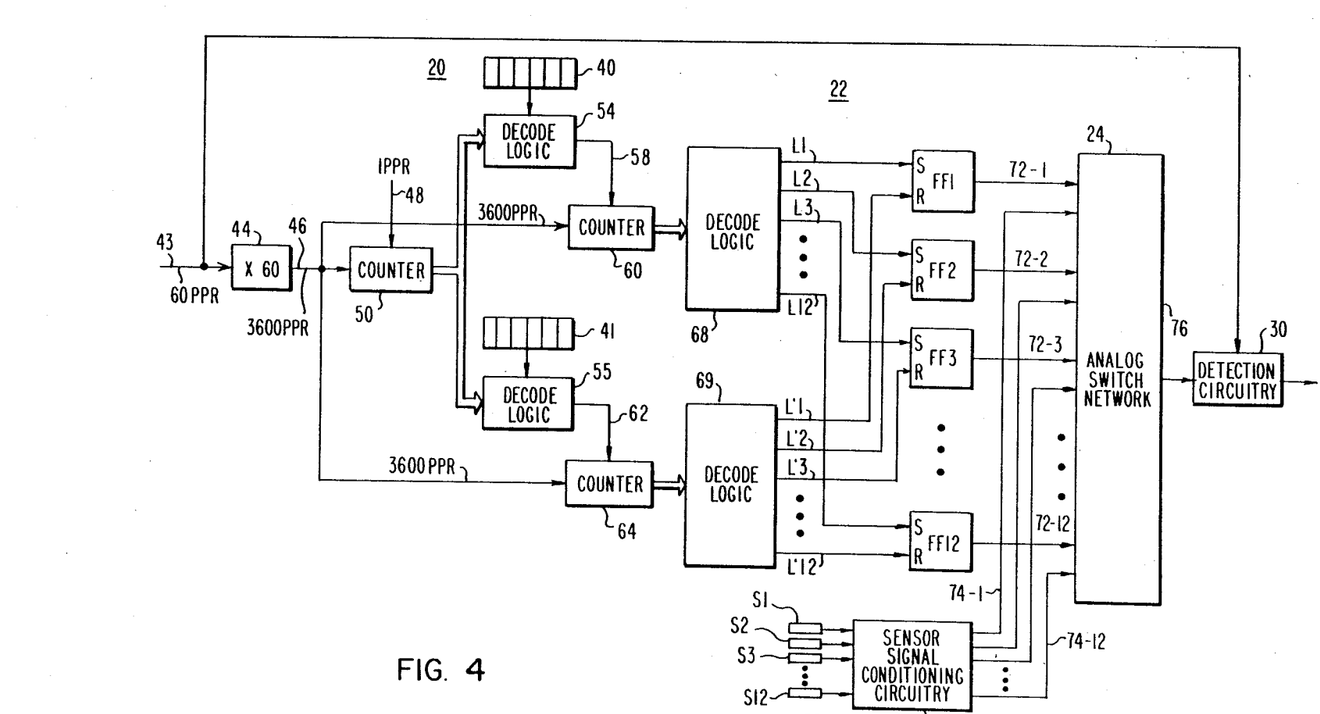
FIG. 4 is a block diagram illustrating portions of FIG. 3 in more detail.

FIG. 4 illustrates some of the components of FIG. 3 in more detail. For the 120 blade example, each blade will be 3° from each of its neighboring blades (360°/120=3°). Each blade can be designated therefor in terms of degrees from a reference position. For example if the reference position is located at blade B120, blade B1 will be 3° displaced from the reference, blade B8 will be 24° from the reference, blade B100 will be 300° from the reference, etc. In the present apparatus, the window for gating a sensor signal is opened x° prior to the blade's normal expected arrival at the sensor and is left open for y° after that. By way of example, x and y may both be equal to 1° resulting in a window of 2° which can accommodate maximum vibratory movement of the designated blade about its normal position.

Accordingly, and as illustrated in FIG. 4, means are provided for the operator input of a selected blade in the blade row. This is accomplished in one embodiment with the provision of thumbwheel switches 40 and 41 with thumbwheel switch 40 being for operator input of the degree location at which the window is to open and thumbwheel 41 being for operator input of the degree location at which the window is to close. For example let it be assumed that blade B8 is to be initially examined for excessive vibration. Blade B8 is disposed 24° from the reference at blade B120 and since the window is to open 1° before the arrival, thumbwheel switch 40 will be set to 23°. Thumbwheel switch 41 will be set to 25°, that is, 1° past the blade position.

The 60 pulse per revolution signal from sensor R2 is provided on line 43 to a phase locked loop multiplier 44 which multiplies the signal by 60 to derive a 3600 pulse per revolution signal on line 46. Each time the turbine shaft makes a complete rotation, a one pulse per revolution signal from sensor R1 is provided on line 48 to reset a counter 50 operable to count the pulses on line 46 with each pulse of the 3600 representing 1/10 of a degree of rotation.

The counter output is provided to decode means in the form of two decode logic circuits 54 and 55 which respectively receive the thumbwheel settings from switches 40 and 41, with each decode logic circuit being operable to provide an output signal when the running count of counter 50 corresponds to the thumbwheel switch setting. Accordingly, for the present example when counter 50 has attained a count of 230 corresponding to the 23° setting of switch 40, the decode logic circuit 54 will provide an output signal on line 58 to reset a counter 60. Similarly, when counter 50 has attained a count of 250 corresponding to the 25° setting of switch 41, the decode logic circuit 55 will provide an output signal on line 62 to reset a counter 64.

Both counters 60 and 64 are connected to receive the 3600 pulse per revolution signal from line 46 with counter 60 starting its count when the shaft has attained a position 23° displaced from the reference position while counter 64 commences its count 2° later. The outputs from counter 60 and 64 are provided to respective decode logic circuits 68 and 69 which are instrumental in generating a narrow 2° window for gating the signal of the first sensor and for generating 11 more such windows in series for sequentially gating the outputs of the remaining sensors at the exact time that the blade under investigation should pass a particular sensor (±1°).

The decode logic circuits 68 and 69 respectively include one output line for each of the sensors positioned around the blade row. Decode logic circuit 68 therefore includes 12 lines designated L1 to L12 and decode logic circuit 69 includes a similar number of lines designated L'1 to L'12. Upon resetting of counter 60, corresponding to the 23° location, decode logic circuit 68 will provide an output on line L1. 300 counts later corresponding to 30°, an output will be provided on line L2 with the operation being such that an output signal is provided on subsequent lines for each 30° of rotation corresponding to the 30° separation between each of the 12 sensors. Decode logic circuit 69 operates in the same manner providing an output signal on line L'1 upon the resetting of counter 64 and an output on subsequent lines for each subsequent count corresponding to 30°. It is seen therefore that counter 64 and decode logic circuit 69 operate in a manner identical to that of counter 60 and decode logic 68, however, such operation is delayed by 2°, corresponding to the window to be generated.

When an output is provided on line L1 it is operable to set a flip-flop FF1 which gets reset 2° later by the output signal on line L'1. Accordingly, the output of FF1 on line 72-1 constitutes the 2° window or gating signal which is supplied to analog switch network 24. 30° after FF1 is set, FF2 is set by a signal on line L2 and is reset by a signal on line L'2 thus providing a second gating signal on line 72-2, 30° after the first gating signal. Each 30° thereafter, outputs on subsequent lines from decode logic circuit 68 set flip-flops FF3 to FF12 which are reset by respective outputs on lines L'3 to L'12 of decode logic circuit 69, with the entire operation being such as to generate 12 2° gating signals 30° apart at the exact appropriate time for gating the conditioned signals from sensors S1 to S12 of the array 26.

Although decode logic circuit 68 and 69 provide initial outputs upon resetting of respective counters 60 and 64, it may be desirable to delay the output for several degrees since there may be an ambiguity between 0° and 360° since they are identical points. Accordingly, the decode logic circuits may be designed to provide their first output signals when their respective counters have attained a count of 10° (or any other chosen value other than 0). Since there is a 10° delay after the resetting of counters 60 and 64 until a first output signal is provided, the setting of thumbwheel switches 40 and 41 must be adjusted accordingly by subtracting 10° from the desired position. Thumbwheel switch 40 will be set to 13° and thumbwheel switch 41 will be set to 15°, that is, the original desired setting minus the delay. If the subtraction results in a negative number, such as for blades B1 to B3, 360 must be added to the setting.

With the built in delay, operation is identical to that previously described without the 0°/360° ambiguity. 2° gating signals are still provided at the correct time on lines 72-1 to 72-12 to function as control signals for the analog switch network 24 for sequentially gating conditioned sensor signals appearing on lines 74-1 to 74-12. All of the sequentially gated conditioned sensor signals are summed together at output 76 and provided to detection circuitry 30 which additionally receives the 60 pulse per revolution signal on line 43 to derive an output indicative of any vibratory condition of the selected blade B8, in a manner to be subsequently described.

Figure 5:
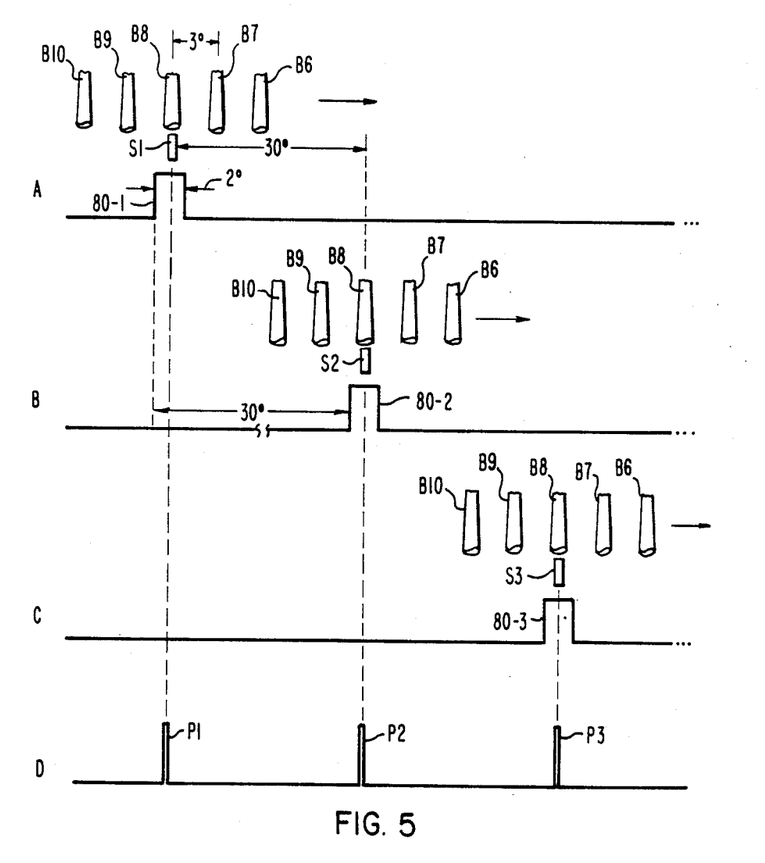
FIGS. 5A through 5D are diagrams to aid in the understanding of the operation of the circuitry of FIG. 4.
Figure 6A:
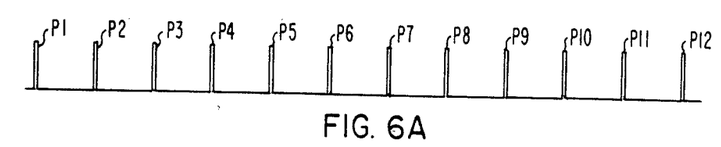
FIG. 6A illustrates the sensor output signals for a complete rotation of the blade row in the absence of any blade vibration and FIG. 6B illustrates the sensor outputs with two sensor misalignments.

FIGS. 5A to 5D serve to illustrate the previously described operation. Several of the blades, B6 to B10, are shown travelling in the direction of the arrow, with a 3° separation between each blade. A first 2° window 80-1 is generated at the precise time to gate the signal from sensor S1 caused by blade B8 under investigation. A sensor signal, more particularly the conditioned sensor signal then appears as a very narrow pulse P1 on the output line 76 of the analog switch network 24, such output being represented by FIG. 5D. Exactly 30° later a second 2° window 80-2 is generated to gate the second sensor signal resulting from passage of the same blade, B8, as illustrated in FIG. 5B with the gated conditioned sensor signal appearing as narrow pulse P2 in FIG. 5D. FIG. 5C illustrates a third 2° window 80-3 for gating the output signal from sensor S3 caused by the same blade B8 with the resulting narrow pulse P3 appearing in FIG. 5D. The process continues and for one complete rotation, 12 pulses are provided as illustrated in FIG. 6A, with each pulse being exactly 30° from an adjacent pulse, in the absence of any blade vibration and in the absence of any sensor misalignment. In the presence of vibration the pulses would be unevenly spaced, with the spacing between pulses being modulated by the frequency or frequencies of vibration of the monitored blade.

Figure 6B:
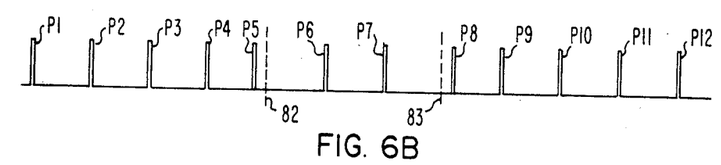

During the installation of the sensor array it is imperative that the sensors be precisely located around the blade row 30° from one another. FIG. 6B illustrates the result of a misalignment of two sensors such as sensors S5 and S8. In the absence of any blade vibration which modulates the pulse train signal, all of the pulses except pulses P5 and P8 are located in their respective normal proper positions. Due to the sensor misalignment however pulse P5 occurs prior to its normal time indicated by dotted line 82 while pulse P8 occurs subsequent to its normal time as indicated by dotted line 83. The misalignment is equivalent to a modulation of the pulse train signal and may cause an undesired output indicating a blade vibration when in fact no blade vibration exists.

In the present invention compensation is provided for any possible sensor misalignment so as to prevent incorrect vibration indicative outputs. This is accomplished in the signal conditioning circuit 28 illustrated in more detail in FIG. 7.

Figure 7:
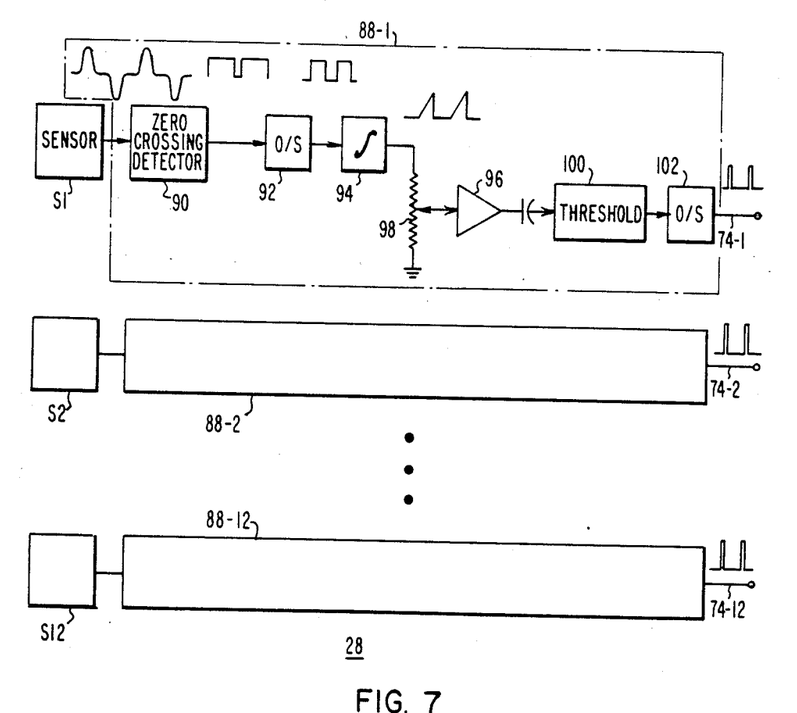
FIG. 7 is a block diagram to illustrate a sensor output signal conditioning circuit.

For 12 sensors there are 12 identical signal processing channels, one of which, 88-1, is illustrated. As each blade passes a sensor, the sensor will provide a positive going then negative going signal in response to blade passage. This signal is provided to a zero crossing detector 90 resulting in a square wave output to trigger a one-shot multivibrator 92. The uniform pulses from the one-shot multivibrator 92 are provided to integrator 94 resulting in a ramping output signal as indicated.

The ramp signal from integrator 94 is provided to an amplifier 96 via an adjustable potentiometer 98. The output of amplifier 96 is coupled to a threshold device 100 which will provide an output when and only when the amplified ramp signal exceeds a preset threshold. When the threshold is exceeded, an output signal will be provided to another one-shot multivibrator 102 operable to provide, on output line 74-1, an extremely narrow output pulse constituting a conditioned sensor signal. Although a pulse will be provided for each blade passage, only that particular pulse caused by the blade under investigation will be gated for detection purposes, as previously explained.

Figure 8:
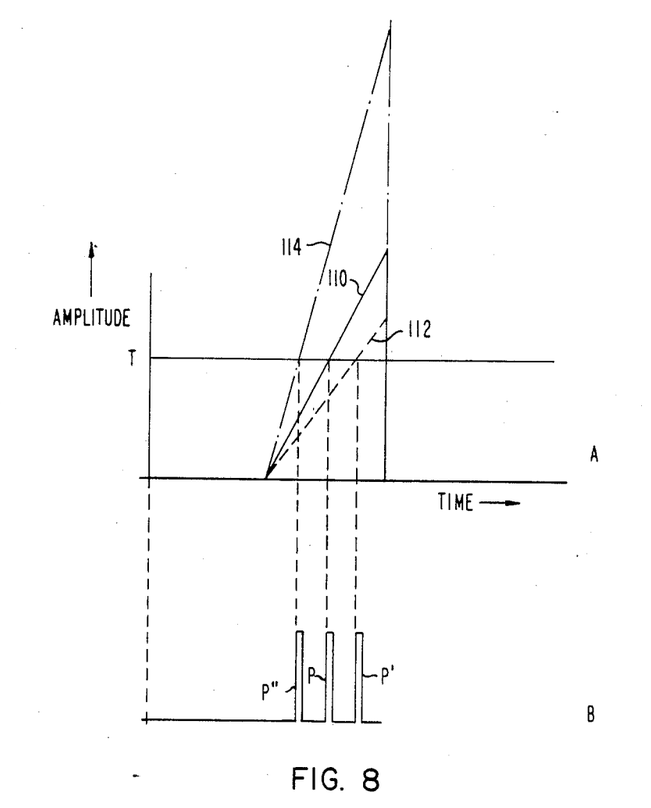
FIGS. 8A and 8B are waveforms illustrating the operation of a portion of FIG. 7.

The adjustable potentiometer 98 in conjunction with amplifier 96 provides a means to vary the amplitude, and accordingly the slope of the ramp signal from integrator 94. With further reference to FIG. 8A, the ramp signal 110 shown in solid line will cause the one-shot multivibrator 102 to provide a narrow pulse output P when the ramp signal crosses threshold level T. With the apparatus running at a reduced speed in which it is known with a high degree of certainty that no blade vibration exists, each pulse position in the pulse train may be examined to see that it is in the proper 30° relationship with its neighboring pulses. If it is determined that the pulse is premature, potentiometer 98 may be adjusted to reduce the amplitude of the ramp as indicated by dotted waveform 112 of FIG. 8A. In such instance the threshold will be crossed at a later point in time displaced from its normal position by an amount equivalent to the sensor misalignment. Conversely, if it is determined that the pulse occurs subsequent to its normal time of occurrence the ramp signal amplitude may be increased as indicated by dot dash ramp signal 114 resulting in a crossing of the threshold and a pulse P'' advanced in time by the proper amount. In addition to correcting for sensor misalignment, the signal conditioning circuitry may also correct for non uniform sensor response.

Figure 9:
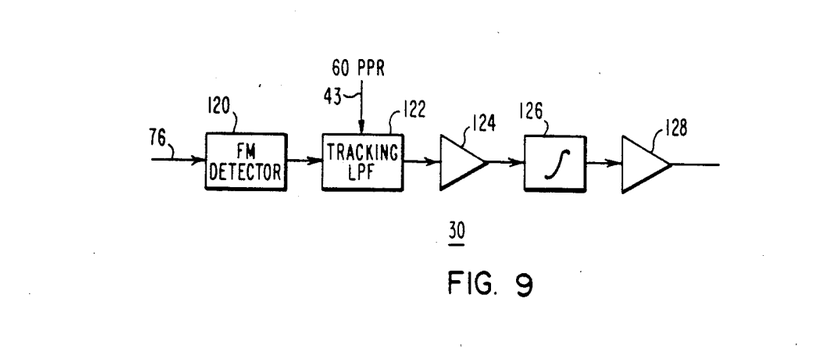
FIG. 9 is a block diagram further illustrating the detection circuitry of FIG. 3.
Figure 10A:
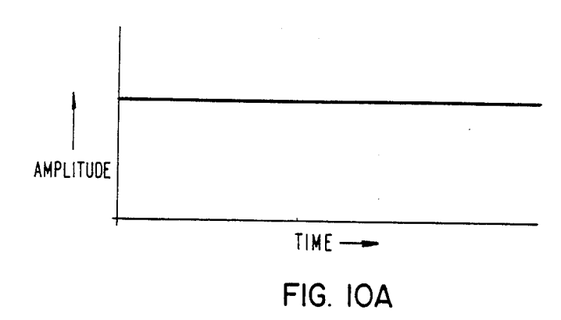
FIGS. 10A and 10B illustrate possible waveforms that may be seen in the circuitry of FIG. 9.
Figure 10B:
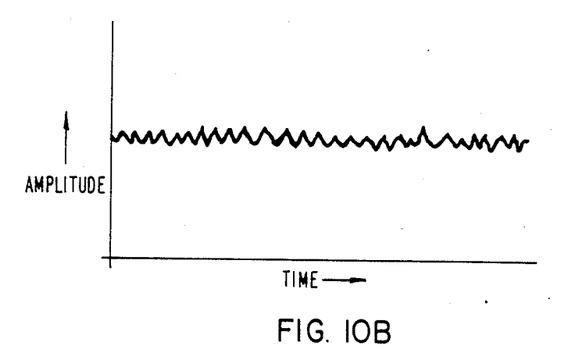

For any blade under investigation 12 pulses will be provided every time the turbine shaft rotates through one revolution. In the absence of blade vibration, pulses will be evenly spaced and will have a frequency depending upon the turbine speed. For example at a running speed of 3600 rpm the turbine will rotate 60 times in one second. With 12 pulses produced for each revolution the pulse train will have a frequency of 12 times 60 or 720 Hz. The pulse train constitutes a carrier signal which, in the presence of any blade vibration, is modulated by the frequency of vibration. By extracting this modulating information from the pulse waveform, an indication of blade vibration may be derived. In order to accomplish this, the detection circuitry 30 as detailed in FIG. 9 includes FM detection means 120 operable to receive the frequency modulated pulse train signal presented to it on line 76 from the analog switch network. The detector means is operable to frequency demodulate the signal and provide a composite output signal comprised of a DC level, representing the carrier, superimposed upon which is the modulating information relating to blade vibration. The DC level indicative of the carrier is illustrated in FIG. 10A and the superimposed modulating information is illustrated in FIG. 10B.

A low pass filter is provided for removing the DC carrier so that just the modulating information is amplified in amplifier 124. Since the DC level indicative of the carrier frequency is proportional to turbine speed, low pass filter 122 is of the tracking variety to adjust for various speeds. A speed indicative signal is provided to the tracking filter 122 by means of the 60 pulse per revolution signal on line 43.

The information derived from the demodulation process and appearing at the output of amplifier 124 represents blade velocity. For blade vibration analysis an indication of blade displacement is required. Accordingly, integrator 126 is provided to derive the displacement indicative signal in a well-known manner since a velocity integration yields displacement. The resulting integrated signal is amplified in amplifier 128 for presentation to a utilization means one example of which is a real time analyzer.

Figure 11:
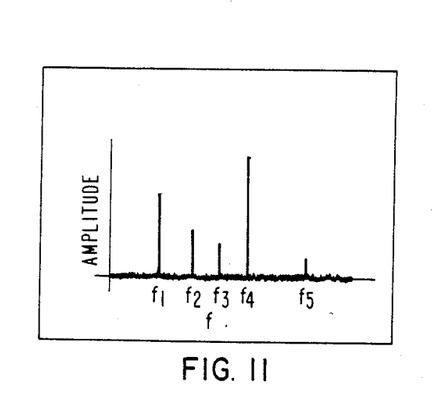
FIG. 11 illustrates one type of utilization means of FIG. 3.

Typical commercially available real time analyzers include signal processing means for performing a Fourier analysis on an input signal, and a display for displaying the results of an analysis. FIG. 11 represents a typical display wherein amplitude is plotted on the vertical scale and frequency on the horizontal scale. The results of an analysis is presented on the display which shows a very strong (large displacement) response at frequency $f_4$, a lower response at frequency $f_1$, and progressively lower responses at respective frequencies $f_2$, $f_3$ and $f_5$. Other responses illustrated represent normal noise.

If the blade testing is done prior to field installation, and the results of the testing indicate objectionably high vibration amplitudes at critical speeds, then the blade design may be modified to reduce such vibration. Alternatively, if the blades are being monitored during normal use, various pressure and temperature conditions may be modified in an attempt to reduce objectionable vibration or alternatively the results may indicate that a shutdown is necessary for blade replacement long prior to a catastrophic failure.

Figure 12:
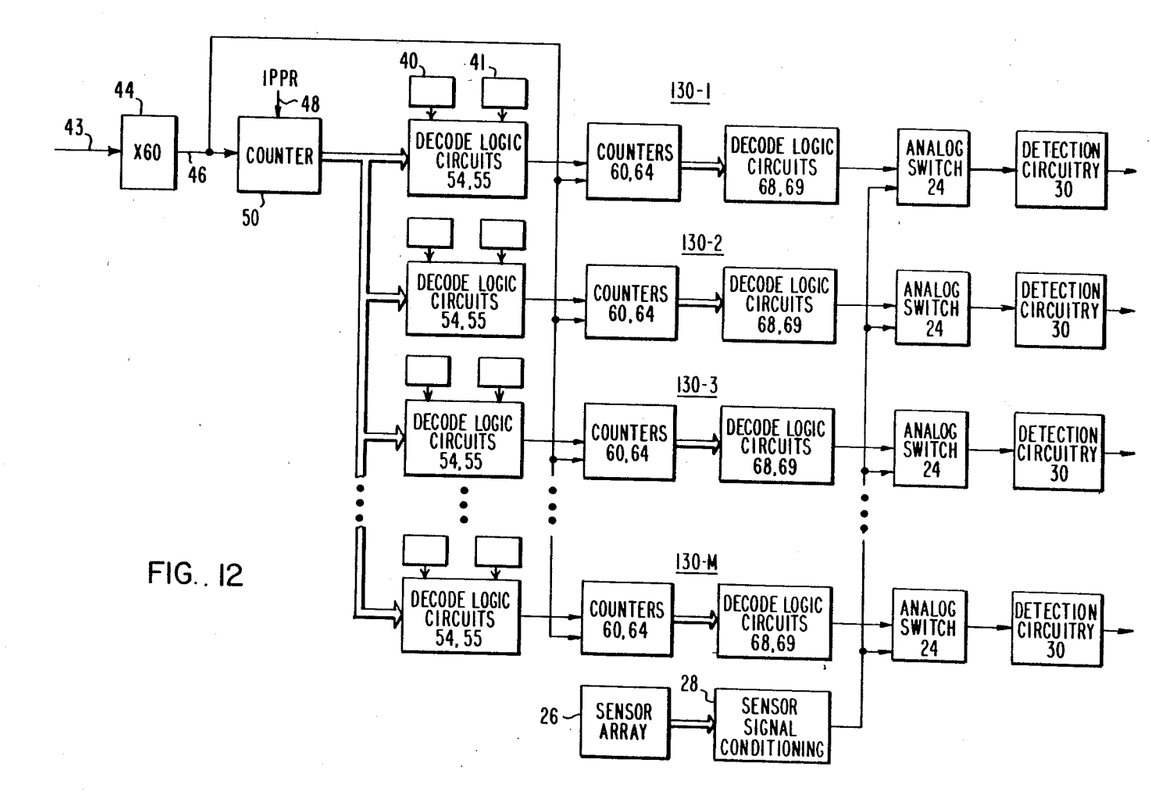
FIG. 12 illustrates another embodiment of the present invention.

In the apparatus thus far described, a single blade at a time is selected for monitoring purposes. After display and/or storage of the results of the monitoring on that particular blade, a new blade may be selected and the process repeated until all or a selected portion of the blades in the blade row have been examined. In FIG. 12 an arrangement is presented operating in accordance with the principles of the present invention whereby a plurality of blades may be simultaneously monitored.

The arrangement of FIG. 12 includes a first channel, 130-1, comprised of components previously described in FIG. 4. These components include the decode logic circuits 54 and 55 provided with input information from thumbwheel switches 40 and 41, counters 60 and 64, decode logic circuits 68 and 69, analog switch 24 and detection circuitry 30. If M blades are to be simultaneously monitored, then M such channels 130-1 to 130-M would be provided for processing the sensor signals from array 26 after conditioning by circuitry 28. The determination of which blades are to be monitored is made by the thumbwheel switch inputs and for the embodiment of FIG. 12 only a single counter 50 providing its count to all of the decode logic circuits 54, 55 of each channel need be included.

Figure 13:
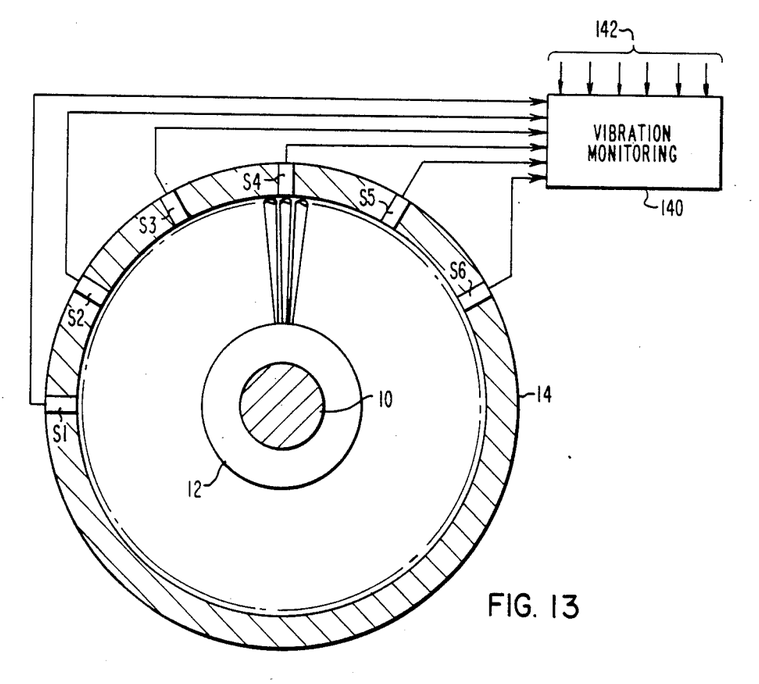
FIG. 13 is a view, as in FIG. 1, illustrating an arrangement utilizing a reduced number of sensors.

In the arrangement illustrated in FIG. 13, only six sensors S1–S6 are utilized with each being equally spaced from one another over approximately half of the blade row. The angular distance between adjacent sensors S1 and S6 is much greater than between any other two adjacent sensors. The six sensor signals are provided to the vibration monitoring apparatus previously described and indicated by the general numeral 140 in FIG. 13. Six additional signals in the form of dummy signals 142 are provided to the apparatus 140 to simulate six additional sensors and although these sensor signals are fixed, they contribute to the carrier signal but convey no information with respect to blade vibration. The apparatus will provide a blade vibration indication, however, at a reduced accuracy.

Although the invention has been described with respect to a single blade row of a steam turbine it is to be understood that the apparatus can be utilized to measure blade vibration in a plurality of blade rows in steam and other types of turbines as well as other types of bladed machinery. In general, the number of sensors utilized will be a function of the highest vibration frequency of interest as well as rotational speed. In the example given, at a running speed of 3600 rpm 12 sensors are utilized resulting in an FM carrier frequency of 720 Hz and high enough to derive displacement information relative to a 400 Hz vibration. If the running speed is reduced to half the 3600 rpm value, that is 1800 rpm, a rated speed for many turbine units, then with the 12 sensor arrangement the carrier frequency would be 360 Hz and the maximum measurement frequency would be 200 Hz. This may be sufficient for expected blade vibration, or alternatively a greater number of sensors may be utilized.

I claim:

1. Blade vibration detection apparatus for detecting vibration of a blade in a rotating blade row of a machine, comprising:
   (A) a plurality of sensors disposed about said blade row with each sensor being operable to provide an output signal upon relative passage of a blade;
   (B) signal conditioning means responsive to said sensor output signals and operable to provide respective corresponding sensor pulse signals;
   (C) means for selecting a particular blade to be monitored;

(D) means for sequentially combining all of the sensor pulse signals caused by said selected blade as it passes the respective sensors, to derive a pulse train signal modulated as a function of any vibration of said selected blade; and (E) detection circuitry including FM detection means operable to demodulate said pulse train signal to derive a blade vibration indicative signal.

2. Apparatus according to claim 1 wherein:
   (A) said plurality is comprised of N sensors; and
   (B) the angular spacing between any two adjacent sensors is 360°/N.

3. Apparatus according to claim 1 wherein:
   (A) said plurality is comprised of N sensors; and
   (B) the angular spacing between the 1st and Nth sensors is greater than the angular spacing between any other two adjacent sensors.

4. Apparatus according to claim 1 wherein:
   (A) said angular spacing between the 1st and Nth sensors is at least 180°.

5. Apparatus according to claim 1 which includes:
   (A) display means; and
   (B) means for providing said vibration indicative signal to said display means for display thereof.

6. Apparatus according to claim 1 wherein:
   (A) said display means is a real time analyzer.

7. Apparatus according to claim 1 wherein said signal conditioning means includes:
   (A) a plurality of signal conditioning channels, each for receiving a respective sensor output signl;
   (B) each said channel including means for converting said output signal to a narrow pulse and for selectively advancing or retarding the position of said pulse.

8. Apparatus according to claim 7 wherein said means for converting includes:
   (A) first circuit means for converting said output signal to a corresponding ramp signal;
   (B) second circuit means for selectively adjusting the amplitude of said ramp signal;
   (C) threshold means operable to provide an output signal when an input signal applied to it exceeds a predetermined threshold value;
   (D) means for providing said selectively adjusted ramp signal to said threshold means; and
   (E) third circut means responsive to said output signal of said threshold means to generate a narrow pulse.

9. Apparatus according to claim 8 wherein said first circuit means includes:
   (A) a zero crossing detector operable to provide an output signal in response to receipt of said sensor output signal;
   (B) a one-shot multivibrator operable to provide a square wave output signal in response to said zero crossing detector output signal; and
   (C) integrator means operable to provide said ramp signal in response to said square wave signal.

10. Apparatus according to claim 1 wherein said means for selecting includes:
    (A) means for generating a reference pulse upon each complete revolution of said blade row;
    (B) means for generating a plurality of equally spaced pulses during said revolution, the totality of pulses at any instant of time being indicative of the amount of angular rotation past a reference position at which said reference pulse is generated,
    (C) 1st counter means operable to reset upon each said complete revolution in response to application of said reference pulse and to start counting said plurality of pulses;
    (D) means for operator entry of 1st and 2nd angular positions, said 1st angular position being related to the normal angular position of said blade to be monitored, relative to said reference position, minus some angle x, said 2nd angular position being related to the normal angular position of said blade to be monitored relative to said reference position plus some angle y;
    (E) means responsive to the count of said 1st counter means and said operator entered 1st and 2nd angular positions to generate a series of gating signals each being of a duration corresponding to the time of travel of said blade through an angle of $x+y$; and
    (F) means for applying said gating signals to said means for combining in a manner to sequentially gate said sensor pulse signals caused by said blade to be monitored.

11. Apparatus according to claim 10 wherein:
    (A) said angle $x=$ said angle y.

12. Apparatus according to claim 10 wherein said means to generate includes:
    (A) 1st decode means responsive to the count of said 1st counter means and operable to provide 1st and 2nd output signals upon attainment by said 1st counter means of counts corresponding to said 1st and 2nd angular positions;
    (B) second counter means including 1st and 2nd counters each operable to count said plurality of pulses;
    (C) means for applying said 1st output signal to said 1st counter to reset it;
    (D) means for applying said 2nd output signal to said 2nd counter to reset it;
    (E) 2nd decode means including 1st and 2nd decode logic circuits;
    (F) said 1st decode logic circuit being resonsive to particular counts of said 1st counter to generate a series of 1st signals;
    (G) said 2nd decode logic circuit being responsive to particular counts of said 2nd counter to generate a series of 2nd signals each displaced in time from a respective one of said 1st signals; and
    (H) means responsive to said 1st and 2nd series of signals to provide said gating signals.

13. Apparatus according to claim 12 wherein said means to provide includes:
    (A) a plurality of flip-flops each responsive to a respective one of said 1st signals to be placed into a set condition;
    (B) each said flip-flop being responsive to a later supplied respective 2nd signal to be placed into a reset condition.

14. Apparatus according to claim 10 wherein:
    (A) said means for combining is an analog switch network having a single output.

15. Apparatus according to claim 1 wherein said detection circuitry includes:
    (A) low pass filter means connected to receive the output signal from said FM detection means and operable to substantially remove any DC component of said output signal.

16. Apparatus according to claim 15 wherein:
    (A) said low pass filter means is a tracking filter the operation of which is a function of blade row rotational velocity; and which includes (B) means for providing an indication of said velocity to said filter means.

17. Apparatus according to claim 15 which includes:
(A) amplifier means for amplifying the signal passed by said filter means; and
(B) means for integrating said amplified passed signal to derive a blade displacement indicative signal.

18. Apparatus according to claim 3 which includes:
(A) means for generating a plurality of equally spaced dummy sensor pulse signals and combining them with the sensor pulse signals caused by passage of a blade.

19. Apparatus according to claim 1 which includes:
(A) a plurality of means for selecting;
(B) a plurality of means for combining; and
(C) a plurality of detection circuitries whereby a plurality of blades may be monitored at the same time.

20. Apparatus according to claim 1 wherein:
(A) said machine is a steam turbine.

* * * * *